INVENTORS.
ROBERT G. HUXSTER
WALTER S. KATZ
BY: Harry M. Saragovitz,
Edward J. Kelly,
Herbert Berl & S. Dubroff ATTORNEYS.

INVENTORS.
ROBERT G. HUXSTER
WALTER S. KATZ
BY: Harry M. Saragovitz, Edward J. Kelly, Herbert Berl & S. Dubroff ATTORNEYS.

United States Patent Office 3,378,703

Patented Apr. 16, 1968

3,378,703

TEMPERATURE COMPENSATED DIGITAL TIMER FOR PRECISELY CONTROLLING TRIGGERING OF FUZE

Robert G. Huxster, Oak Ridge, and Walter S. Katz, Sparta, N.J., assignors to The United States of America as represented by the Secretary of the Army Filed July 6, 1964, Ser. No. 380,715

4 Claims. (Cl. 307—293)

ABSTRACT OF THE DISCLOSURE

An electronic timing system having four stage binary decade frequency divider and counter circuits which reduce the basic frequency supplied by temperature compensated inductively coupled oscillator and provide the desired time delay. A load circuit including an SCR is connected to receive a final single output pulse at the end of each timing cycle to control the initiation of pulse-responsive devices.

Figure 1:
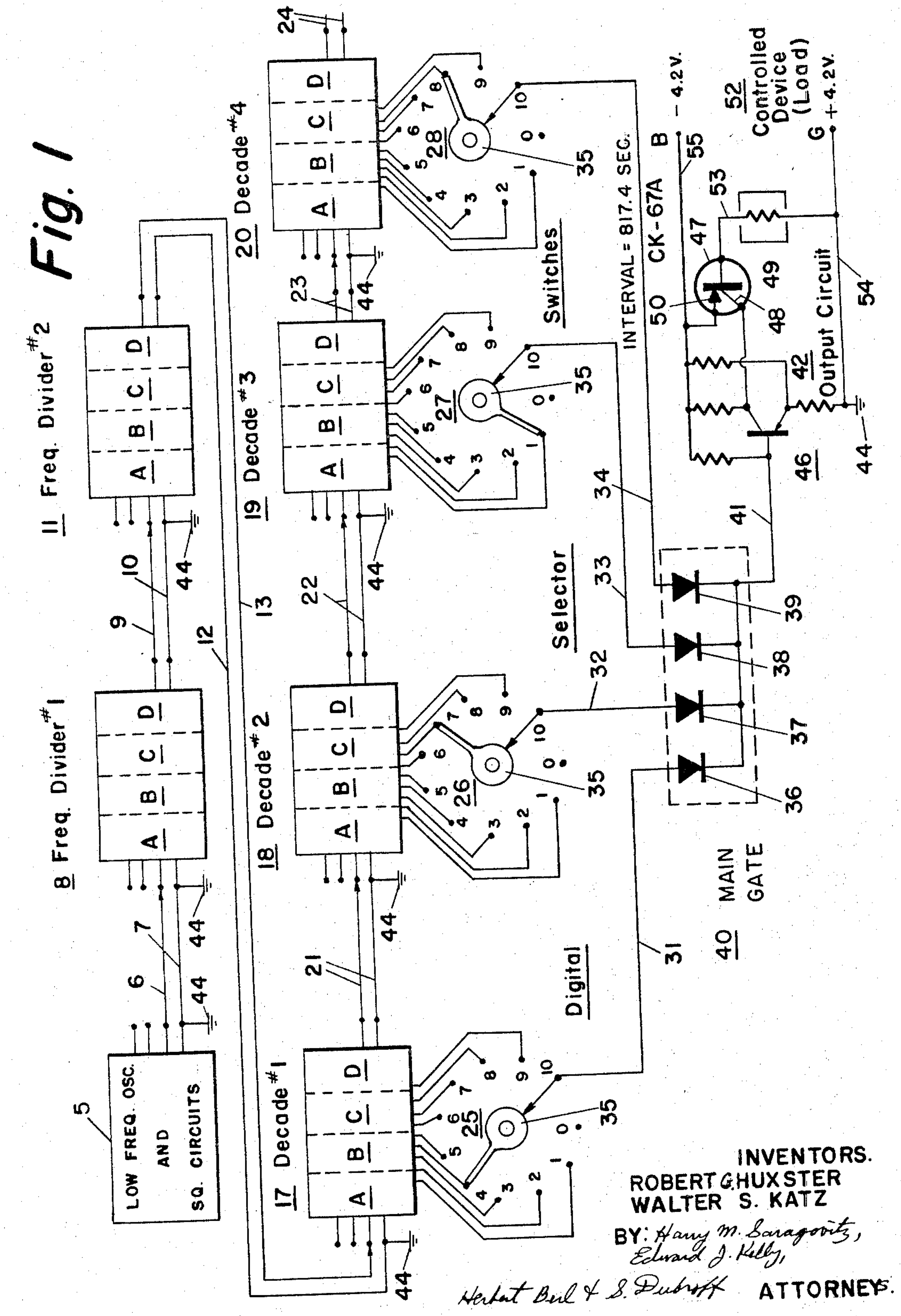

The invention described herein may be manufactured and used by or for the Government for governmental purposes without the payment to us of any royalty thereon.

The present invention relates to an electronic programmer or timing system for missile and rocket firing and the like, where accuracy and reliability in operation are essential.

All-electronic timing systems, generally, give greater accuracy than mechanical systems which involves escapement mechanisms and like mechanical counterparts. The elimination of substantially all moving parts also eliminates problems of tolerances, lubrication and the like, which normally concern mechanical system reliability.

It is an object of this invention to provide an improved electronic programmer or timing system having a relatively-wide timing range with a fine degree of adjustment of the time cycle, and wherein mechanical and electrical modular construction can be employed for greater reliability, and time and cost saving in manufacture.

It is a further object of this invention to provide an improved all-electronic timing system adapted for use with time fuze and like accurate pulse-operated devices, as in missile and rocket delivery systems, and in commercial and industrial applications where compactness, accuracy, and reliability are essential.

In accordance with one form of the invention, a time-base generator or oscillator provides low-frequency basic "clock" or timing pulses which are shaped into square-wave form. A frequency divider net work reduces the basic frequency of the pulses by a predetermined ratio in multiples of ten-to-one. A counter system receives the square-wave pulses or signal at the new and relatively-low frequency and provides a desired time delay which is selected by logic gates therein. A load circuit is connected to receive the final single output pulse or signal at the end of each timing cycle. Where this is a firing circuit the pulse initiates an explosive action, as in a time fuze operation.

The accuracy of this electronic timing system is primarily the function of the stability of the time-base generator or oscillator. A transistor inductively-coupled L-C oscillator with common emitter circuit is used, operating at 1,000 c.p.s., with frequency division to 10 c.p.s. and an accuracy of ±0.1% of its natural frequency for 0.1 second increments of timing signal or pulse output.

The counter system as well as the frequency divider network, is provided by like decade binary circuit elements or units adapted for mechanical and electrical modular construction requiring two binary decades for dividing the oscillator frequency by 100, and four binary decades for the counter system for deriving tenths, units, tens and hundreds output pulses. At each decade a ten-position selector switch is used to extract a useful signal at any pulse from one to ten, to which each decade is limited by feedback and by the AND logic or gating circuits. Relatively high-impedance gating circuits are used with the binary decades so that the latter are not loaded adversely. AND diode circuits are used because of compatability with the rest of the system and simplicity of operation. These have multiple signal input circuits and a single output circuit where a pulse appears only if a pulse of common polarity is applied to all input circuits.

The invention will further be understood from the following description of certain embodiments thereof, when considered with reference to the accompanying drawings, and its scope is pointed out in the appended claims.

In the drawings:

FIG. 1 is a schematic circuit diagram, partly in block form, showing an electronic modular programmer or timing system embodying the invention.

Figures 2, 3:
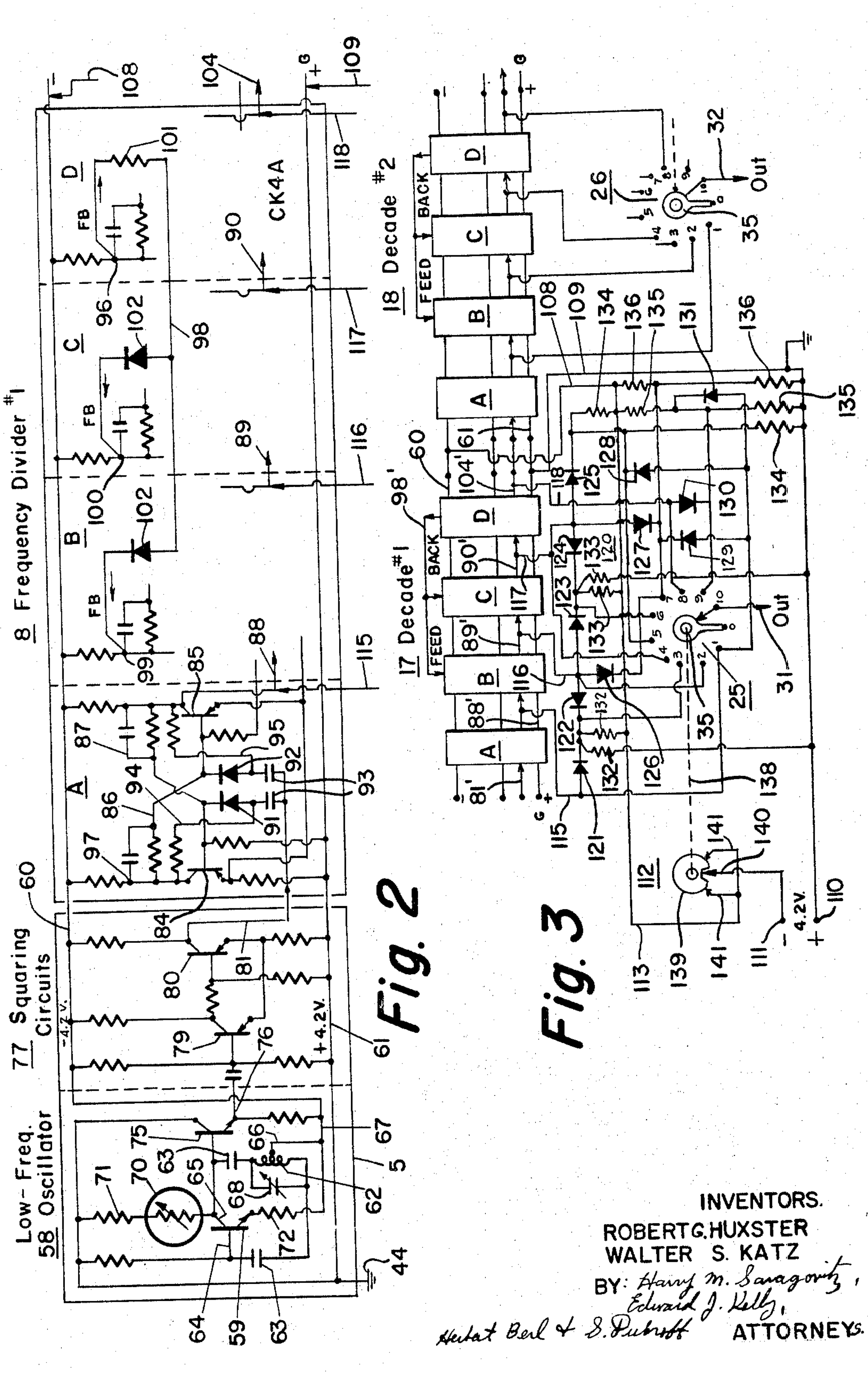

FIG. 2 is a further schematic circuit diagram of a portion of the system of FIG. 1, showing details of the circuits in certain of the block elements or units thereof, further in accordance with the invention, and FIG. 3 is also a further schematic circuit diagram showing further details of certain pulse selector circuits common to a plurality of the modular block elements of the system of FIG. 1 in accordance with the invention.

Referring to the drawings wherein like reference characters and numbers are applied to like circuits and circuit elements throughout the various figures, and referring particularly to FIG. 1, a time base or "clock" for the timing system is provided by a low-frequency oscillator and squaring-circuit portion or unit 5, the output circuit 6–7 of which is connected to a first four-section or four-stage binary-decade or frequency-divider unit 8. The output circuit 9–10 of this unit is connected to a second four-section or four-stage binary-decade or frequency-divider unit 11 having an output circuit 12–13. All four stages, indicated at A, B, C, and D, of each of the binary decade or divider units 8 and 11, are alike for modular purposes, and of the bistable multi-vibrator type, with feedback to provide in each unit a 10:1 frequency division for an overall step-down or division of 100:1. Thus with a 1000 cycle (c.p.s.) signal output from the oscillator and squaring circuit or generator unit 5, a square-wave 10-cycle (c.p.s.) signal is provided at the output circuit 12–13 in the present system. The generator unit or oscillator produces a signal which is a multiple of ten in this system.

The same type of four-stage binary decade units are provided in the counter system which follows the frequency divider means. All of these units are thus adapted for modular construction while being more stable in operation than other known types. Four decade units 17, 18, 19 and 20, are provided in the present system for deriving a timing count in seconds respectively by tenths, units, tens and hundreds, up to 999.9 seconds in 0.1 second increments. Each unit has the four stages, A, B, C and D, like the divider units. This design thus aids in manufacture and assembly since all twenty-four stages may thus be of like mechanical and electrical modular construction. The output circuit 12–13 from the divider is connected to the first decade unit 17 of the chain of four units. Each unit is connected to the next through an output circuit as indicated at 21, 22, 23 and 24 for the units 17, 18, 19 and 20 respectively, the last being open.

A ten-position digital selector switch is provided in connection with each of the counter decades 17–29, as indicated at 25, 26, 27 and 28 respectively, for selectively deriving from each decade unit a useful signal at any pulse from one to ten. The signal or pulse output leads from the switches, indicated respectively at 31, 32, 33 and 34, are connected between the switch selector contacts 35 and individual diode elements 36, 37, 38 and 39, respectively, in a main AND gate 40.

The digital selector switches 25–28 may be set to derive from each decade a useful signal pulse to be applied to the main gate 40 with the others at a time to produce a single pulse or signal output therefrom. As indicated in the circuit of FIG. 1, the timing cycle is set up for completion or signal output at 817.4 second intervals, as the first decade 25 provides seconds count in tenths, the second decade 26 in units, the third decade 27 in tens, and the fourth decade 28 in hundreds, as hereinbefore indicated.

Thus the four-input AND gate 40 operates to provide an output pulse when a pulse of common polarity is applied to all input circuits from the selector switches. The output pulse or signal is applied to a common output circuit conductor 41 which is connected with the output side or electrode of each of the diode gate elements 36–39 and electrode of each of the diode gate elements 36–39 and with the main output circuit 42 for the system, as shown.

The main output circuit 42 is provided with a common return circuit connection or common ground 44 with the remainder of the system which is likewise so provided. This common ground is indicated throughout the circuit, as in connection with the common input-output connections on the low side of the signal channel, by the same numerical designation, and where the ground symbol appears. However any other suitable common return circuit provision may be made to effect the same result, as is understood.

The main or final output circuit for the system is provided with a transistor amplifier 46 connected with the single gate output lead 41 and coupled to a control rectifier 47, also of the solid-state type, and, preferably as indicated, being of the silicon control rectifier type (SCR) having a gate electrode 48 and anode and cathode electrodes, 49 and 50 respectively, for heavy current conduction when fired by the gate electrode 48. With this circuit, the single output pulse through the lead 41 (and ground 44) is amplified in the stage 46 to produce a single amplitude large enough to fire or gate the SCR rectifier 47.

The rectifier may be used to close a detonator circuit or operate any controlled device or load element 52 connected in circuit with it, and is capable of passing more current to the load than a conventional transistor switch. At the same time it is not easily fired, and this prevents premature triggering of the rectifier by improper signal or voltage changes as occur, for example, with temperature variations.

In the present example, the load device 52 is connected serially with the rectifir 47 in a rectifier output or load circuit 53 between positive and negative operating current supply leads 54 and 55, respectively, from which the amplifier stage 46 is also energized. Thus when the AND gate 40 operates to produce the timing pulse output, the rectifier is fired and the heavy current flow is available to operate the device 52 or other circuit component, such as a detonator.

As a time base for an electronic timing system or timer, the L-C type oscillator was developed for the unit 5 as being best adaptable for attaining a desired frequency stability with a wide temperature change of from −65° F. to +165° F. and with a degree of accuracy of 0.1%, which is ± one cycle per second at the desired low oscillator frequency of 1 kc. This together with the squaring circuit of the unit 5 is shown in detail in FIG. 2 to which attention is directed, along with FIG. 1.

The low-frequency oscillator circuit 58 is provided with a transistor 59 as the oscillator device connected with operating current supply leads 60 and 61, the latter being positive and grounded to the system return circuit, as indicated. This supply source may be the same as for the output circuit 47, if of ample capacity. The circuit is essentially a common-emitter, inductively-coupled LC feedback or modified Harteley type. A tapped tuning inductor 62 is coupled through capacitors 63 between the base 64 and the collector 65. The tap 66 is connected with the negative supply lead 60 through a common emitter lead 67. The inductor 62 may be of relatively small size and ferrite-cored, and additionally tuned to resonance by a shunt tuning capacitor 68 with which it constitutes the oscillator tank circuit.

A temperature-variable series resistor element 70 is provided in circuit with the collector, as part of a temperature compensating network with a second fixed resistor 71, to maintain substantially constant frequency with temperature change in the range above referred to. Silicon semiconductor material or the like in the resistor element 70 to provide a small positive temperature coefficient is required. It was found that a change of from 7550 ohms to 8220 ohms over the temperature range was effective, with a transistor of the type known commercially as a 2N–190 NPN in the circuit shown, to maintain the desired frequency output of 1000 cycles (c.p.s.). The emitter resistor indicated at 72, was first adjusted and fixed at a value which provided the above output frequency with a single fixed 8000 ohm resistor at 71 and the resistor 70 out of circuit. The two resistors 70 and 71 were then determined as to value and resulted in the resistance change above described with a fixed resistor at 71 of approximately 6800 ohms and the resistor unit 70 providing the above variations with temperature between approximately 7550 and 8220 ohms total.

The transistor 59 is of a type providing a relatively-high current gain and is optimum at low collector current levels and with low leakage current. The frequency stability of the oscillator is thus made substantially dependent upon the component temperature. The operating point of the oscillator is then held constant by the temperature compensating network or elements in the collector circuit. Also the feedback through the coupled windings of the inductor 62, from the collector to the base is sufficient to compensate for energy loss in the base circuit and to sustain oscillations.

A second transistor 75 which may be the same as the transistor in the common 59, emitter circuit, configuration, is coupled with the collector 65 to apply the signal output to the output circuit lead 76 and the squaring circuits 77. It acts as a buffer amplifier stage to reduce the loading effects of these circuits on the oscillator. In the squaring circuits two transistors 79 and 80 are coupled in a conventional (Schmitt) trigger configuration for converting the sinusoidal wave or signal from the oscillator output circuit lead 76 into a square-wave form at an output circuit lead 81, and of which in each case the other circuit lead is the common ground (G) lead 61. This is also an operating current supply lead as referred to above. These transistors may be of the type known commercially as CK4A and are PNP junction transistors in the present example.

In the frequency-divider section 8, which follows the oscillator and squaring circuit unit 5, the first stage A is shown as a complete circuit while the succeeding stages B, C, and D are shown in part to indicate the feedback circuit connections only, since all stages are alike. As shown, each stage comprises two transistors 84 and 85 in a bistable multivibrator circuit with conventional feedback from collector-to-base as indicated by the cross circuit connections 86 and 87. The input circuit connection from the preceding stage, indicated by the leads 88, 89, and 90, and the initial input connection from the square-wave signal at the lead 81, is made through AND gate diodes, as shown at 91 and 92, and coupling or isolating capacitors 93 to the base circuits. Additional D-C coupling to each collector is also provided through circuits 94 and 95.

Feedback is taken from the collector circuit terminal 96 of the fourth stage D, corresponding to the collector circuit terminal 97 of the first stage A, back through a feed-back circuit 98 to like terminals 99 and 100 on the second and third stages, B and C, respectively. The circuit includes a control resistor 101 and blocking diodes 102, as indicated, poled for signal flow in the direction of the arrowed lines. The signal output lead from the fourth stage D is indicated at 104 and corresponds to the leads 88, 89 and 90 of the preceding stages and being coupled in accordance with FIG. 1 into the next stage in the same manner and by the same detailed means as shown for the lead 81 in the present figure.

The bistable multivibrator unit shown for the four stages of the first frequency divider section 8 is used for the second section 11 and all of the stages thereof in the same manner, with feedback. Likewise the four decades 17, 18, 19 and 20 comprise the same four stages with feedback. All may use the same type of transistor as shown in full for the stage A of the divider section 8, which presently is the PNP commercial type, CK4A.

This duplication of stage structure for both the frequency divider and decade counter circuitry simplifies manufacture and servicing and reduces costs. In addition it makes for more readily adapting the system to modular construction physically since the individual stage elements are already modular electrically.

Furthermore, the selection of the binary decade form circuitry for all components makes for highly stable operation. Two complete decades of this type provide the frequency division of 100:1 and four complete decades of this type provide the counter system for reading out time in seconds in tenths, units, tens and hundreds. The four bistable multivibrator stages are connected together in cascade or concatenated relation, with feed back, to form the ten-count binary decade units or sections.

Binary decade counting differs from conventional or normal binary counting. The main difference is in the feedback system. A normal four-stage multivibrator system or unit has a count capacity of sixteen. A four-stage binary decade system eliminates six of the possible sixteen counts through the feedback network, thus allowing an output signal on the tenth input pulse.

The only natural numbers used in a binary decade counter system are one, two, four and eight. All other numbers between one and ten must be made from a combination of the natural binary numbers above given. This is the function of the logic circuits in the decades, which are as above described in each stage.

AND gate diode circuits are used because of compatibility with the system generally and simplicity of operation. The AND logic circuits are combined with the binary decade circuits to provide effective counting for any number of pulses from one to ten. The ten-position selector switches are connected into the decade circuits to select a useful signal at any pulse in this range. Thus time selection in conjunction with logic circuits is provided by ample switch means. The impedance of the gating diode circuits is increased. Thus the use of relatively high impedance gating circuits with the binary decades is a feature of value in this system since these circuits are of simplified form and operate effectively without tending to load the binary circuits and adversely affect the operation thereof.

Referring to FIG. 3, along with the preceding figures of the drawings, the circuit connections for each of the selector switches with its respective decade is shown in detail for the first decade 17. Six main leads are provided in connection with the decade for each switch. Of these leads, one, 108, is from the main negative supply circuit lead 60 of the system and one, 109, is from the main fround or positive supply circuit lead 61 and connected back to a positive current supply terminal 110 for the system. A corresponding negative current supply terminal 111 for the system is connected with the main negative current supply lead 60 for the system through a power switch 112, the lead 108 and a connecting lead 113 from the switch to the lead 108.

The remaining four leads 115, 116, 117 and 118 are connected with the input circuit connection leads from the preceding stage of the decade in the manner indicated at 88, 89, 90, and 104 for the frequency divider decade unit 8 described. Here the four leads are connected, in the manner indicated in FIG. 2, with similar input circuit or interstage connection leads 88′, 89′, 90′ and 104′ in FIG. 3. These leads are connected respectively with switch contacts #1, #2, #4 and #8 directly, and indirectly with the others through the diode and resistor logic network 120 in connection with and between the supply leads 109 and 113. The input lead 81′ corresponds to the input lead 81 of FIG. 2, since both are the same, A stage, in different sections of the system. In the circuit of FIG. 2 it is connected to the lead 12 from the frequency divider section 11.

In the network 120, eleven diodes 121–131 are connected between the switch contacts as shown and with the supply leads 109 and 113 through the resistor elements of the network in voltage-dividing pairs 132–136. The switch 26 and all of the other selector switches are similarly connected with the other decades for selecting the desired total tuning intervals in increment of 0.1 second up to 999.9 seconds with the four decades shown.

The power switch 112 may be connected, as indicated by the dotted connection line 138, with one of the selector switches to be actuated when the selector switch is moved from the off or zero position of the contact means shown for the switches 25 and 26. In the switch 112, a movable contact element 139 bridges an input contact 140 and either of two output contacts 141 when moved from the off position shown, in connection with the switch 25. This applies operating current from the terminal 111 to the supply leads 113–108–60 for all of the modular multivibrator stages and the network 120.

From the foregoing description it will be seen that the present programmer or timer includes a stable L-C oscillator feeding a chain of binary counters which can be set in 0.1 second increments up to 1000 seconds in a simplified circuitry adapted for mechanical and electrical modular construction with the multivibrator stages being used throughout both the frequency divider circuitry and the decade counter circuitry in binary decade form with feedback. A total of twenty-four such stages are used in each system and constitute the major portion thereof. Thus the construction of the system is simplified and reduced in cost by the extensive use of duplicate electrical modular elements.

We claim:

1. An electronic programmer for timing operation of a time fuze, comprising in combination, time-base generator means adapted to provide a relatively-low-frequency square-wave signal output and including a transistor inductively-coupled oscillator with a temperature-compensated collector circuit and common emitter circuit operating at one thousand cycles per second, a frequency-divider network connected with said generator means to reduce the signal output in a ratio which is a multiple of ten-to-one, a signal pulse counter system coupled to receive said signal output and derive a timing pulse therefrom at the end of a selected timing cycle, said frequency-divider network and said pulse counter system each comprising a four-stage binary decade unit with bistable multivibrator-type stages adapted for duplicate modular construction and interstage feedback from the fourth stage to the third and second stages respectively, said frequency-divider network further including a second binary decade unit and providing a frequency division to ten cycles per second, and said counter system further including a plurality of binary decade units connected in series signal-translating relation with the frequency-divider units, and with relatively-high-impedance AND diode and resistor logic gate circuits connected with the binary decade stages to reduce loading effects thereon, each binary decade unit in the counter system including a digital selector switch and means including a main AND gate connected in circuit therewith for deriving from each of said decade units a useful signal at an input pulse count from one to ten, and means including a load circuit connected for receiving and utilizing said timing pulse for triggering one of said fuzes, said load circuit including a silicon-type control rectifier providing a relatively-high operating current to trigger said fuze and a transistor amplifier coupled therewith to drive and fire said rectifier in response to effective signal pulses of predetermined amplitude.

2. An electronic timing system producing an output signal pulse at selectable time intervals in 0.1 second increments for time fuzes and like accurate pulse-operated devices, comprising in combination, a low-frequency inductively-coupled transistor oscillator with temperature-compensated collector and common emitter circuits providing an output signal at a fixed frequency which is a multiple of ten, means for squaring the wave shape and dividing the frequency of said output signal to derive a square-wave tuning signal of a frequency below the oscillator frequency in a ratio of 100:1, said last named means including two four-stage binary decade units for frequency division in series signal-translating relation, a signal pulse counter comprising a plurality of said four-stage binary decade units in series signal-translating relation and with individual signal output circuits, said four-stage binary decade units all having duplicate stages with transistor bistable multivibrator circuits and means including AND diode and resistor logic input circuit connections as modular elements, said four-stage binary decade units provided with interstage feedback from the fourth stage to the third and second stages respectively, a main AND gate connected to receive timed signals from said individual output circuits for producing a single timed output signal pulse therefrom, an output circuit connected to receive and amplify said pulse, a control rectifier device connected to be actuated by the amplified pulse, and a load circuit including a time fuze connected to receive operating current through said device when actuated by said pulse.

3. An electronic timing system as defined in claim 2, wherein a ten-point digital selector switch is provided for each of the counter binary decade units in connection with the individual output circuit therefor and interstage to select the timing of the signal output therefrom for application to said main AND gate, and wherein four of said binary decade units are provided in said series signal-translating relation to provide selectable output pulse timing in second from one-tenth to one thousand.

4. An electronic timing system as defined in claim 3, wherein said series of binary decade units provide said selectable output pulse timing in seconds by tenths in the first unit of the series, by units in the second, by tens in the third, and by hundreds in the fourth.

References Cited

UNITED STATES PATENTS

| | | | |
|---|---|---|---|
| 2,519,184 | 8/1950 | Grosdoff | 328—51 X |
| 2,619,282 | 11/1952 | Manley | 328—51 X |
| 2,825,813 | 3/1958 | Sperling | 307—88.5 |
| 2,937,337 | 5/1950 | Jones et al. | 328—48 |
| 3,159,792 | 12/1964 | Metz | 328—44 |
| 3,202,837 | 8/1965 | Baracket | 328—48 X |
| 3,267,381 | 8/1966 | Thornberg et al. | 328—41 |

OTHER REFERENCES

Millman & Taub: Pulse and Digital Circuits, 1956, McGraw-Hill Book Co., Inc., Fig. 11–3, pages 327–328.

JOHN S. HEYMAN, *Primary Examiner.*